United States Patent [19]
Fukuyo et al.

[11] Patent Number: 5,333,836
[45] Date of Patent: Aug. 2, 1994

[54] SOLENOID VALVE

[75] Inventors: Kei Fukuyo; Shintaro Kawaishi, both of Shizuoka, Japan

[73] Assignee: Nisshinbo Industries Inc., Nihonbashi, Japan

[21] Appl. No.: 115,096

[22] Filed: Sep. 2, 1993

[30] Foreign Application Priority Data

Sep. 9, 1992 [JP] Japan .................. 4-265547

[51] Int. Cl.$^5$ .................. F16K 31/06; B21K 1/24
[52] U.S. Cl. .................. 251/129.15; 29/890.13
[58] Field of Search .............. 251/129.15; 137/454.2, 137/454.5, 454.6; 29/890.13, 890.124, 890.132

[56] References Cited

U.S. PATENT DOCUMENTS

| | | | |
|---|---|---|---|
| 4,540,154 | 9/1985 | Kolchinsky et al. | 251/129.15 |
| 4,679,767 | 7/1987 | Vollmer et al. | 251/129.15 |
| 4,753,416 | 6/1988 | Inagaki et al. | 251/129.15 |
| 5,064,166 | 11/1991 | Schechter | 137/454.2 X |

Primary Examiner—Arnold Rosenthal
Attorney, Agent, or Firm—Nikaido, Marmelstein, Murray & Oram

[57] ABSTRACT

A solenoid valve comprising a housing having at least one cavity, a core assembly including a body, a sleeve attached to the body, and an armature assembly sliding in the sleeve. A core assembly is mounted in at least one cavity of the housing having a lower portion of the body between a side of the body exposed to atmosphere and a side exposed to fluid pressure in use being affixed to the housing by a primary caulking joint inside the cavity and a secondary caulking joint at a mouth of the housing cavity. A coil assembly is mounted on an exterior of38 the core assembly magnetically influencing the armature assembly. The primary caulking joint is formed between a pressure acting surface of the cavity of the housing and a primary sealing groove on the body. The primary caulking joint can be formed by inserting the body into the cavity; and then pressing the body further into the cavity, the pressure-acting surface pressing on a portion of the material of the housing causing the pressed-material to undergo plastic deformation and flow and mold into the primary sealing groove. The secondary caulking joint is formed by a lip of the cavity at the mouth and a ridge on the body.

8 Claims, 6 Drawing Sheets

SOLENOID VALVE

BACKGROUND OF THE INVENTION

This invention relates to a solenoid valve having the portion of the valve, which opens or closes the pressure fluid lines, between the side exposed to the atmosphere and that side subject to the force of the fluid pressure, sealed to the housing in which the valve is mounted.

A solenoid valve of this type is generally installed in a brake pressure control system of an anti-locking brake system to avoid locking in a sudden braking situation, or in a traction control system to avoid spinning of the wheels. As shown in FIG. 8 in such a system, several solenoid valves b are incorporated in a housing which comprises a portion of an anti-locking braking system or traction control system.

In this conventional device, each solenoid valve is set within a respective cavity c of housing a, wherein a cover d affixed to the housing with bolts fits over that side of the solenoid valve exposed to the atmosphere.

The pressure of the fluid acting on the solenoid valve b presses the valve in the direction of the atmosphere, necessitating a cover d and bolts e formed from material of sufficient strength to withstand the pressure. This material adds to the high cost, weight, and bulk of the cover. Additionally, when the brake pressure increases, the cover d is pressed against the solenoid valve b causing elastic deformation wherein the solenoid valve b moves in the direction of the atmosphere; when the pressure decreases the valve reverses in the other direction. Consequently, the rubber seal f attached to the solenoid valve b is subjected to pressure and slides between the housing a and the solenoid valve b. This causes the rubber seal f to be easily subject to wear and tear, reducing the reliability of the seal. Further, when the pressure increases, extra fluid in an amount corresponding to the distance the solenoid valve b slides is consumed; whereby if the solenoid valve is used in the hydraulic brake system of a vehicle, the brake pedal stroke increases.

OBJECTS AND SUMMARY OF THE INVENTION

An object of this invention is to provide a solenoid valve in which that portion of the core assembly between the side exposed to the atmosphere and the side which receives the force of the fluid pressure is sealed and affixed securely to the housing by two caulking joints.

A second object of the present invention is to provide a solenoid device which has a configuration that enables it to be low cost, lightweight, and compact.

A third object of the present invention is to provide a solenoid valve wherein fluid consumption can be reduced.

This invention was devised to resolve the difficulties described above by providing a solenoid valve comprising certain particular structure. A housing is provided having at least one cavity. A core assembly including a body, a sleeve attached to the body, and an armature assembly sliding in the sleeve, is mounted in the at least one cavity of the housing having a lower portion of the body between a side of the body exposed to atmosphere and a side exposed to fluid pressure in use being affixed to the housing by a primary caulking joint inside the at least one cavity and a secondary caulking joint at a mouth of the housing cavity. A coil assembly is mounted on an exterior of the core assembly magnetically influencing the armature assembly.

The primary caulking joint is formed between a pressure acting surface of the at least one cavity of the housing and a primary sealing groove on the body. The primary caulking joint can be formed by inserting the body into the at least one cavity; and pressing the body further into the at least one cavity with the pressure-acting surface pressing on a portion of the material of the housing causing the pressed-material to undergo plastic deformation and flow and mold into the primary sealing groove.

The secondary caulking joint is formed by a lip of the at least one cavity at the mouth and a ridge on the body. The secondary caulking joint can be formed by applying pressure on a portion of the material of the housing adjacent the mouth causing the pressed-material to undergo plastic deformation and flow and mold into the ridge.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENTS

Example 1

Figure 1:
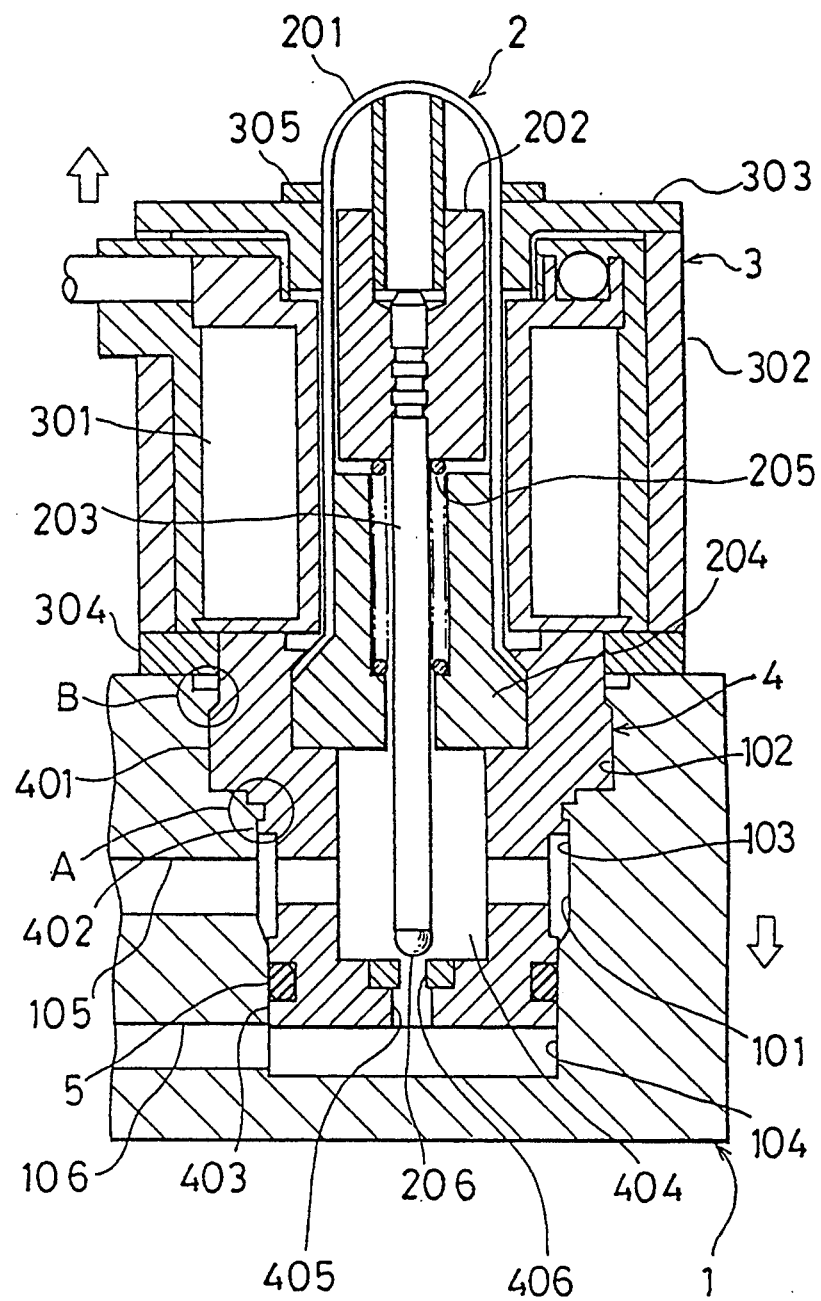
FIG. 1 is a cross section diagram of the solenoid valve in accordance with the present invention in its entirety as embodied in Example 1.

A first example of this invention is explained below with reference to the diagrams. FIG. 1 illustrates a first example of a normally open 2-position-2-way solenoid valve. However, this invention can be employed as a normally closed solenoid valve, or as devices other than a solenoid valve such as a pressure relief valve or a variety of stoppers.

As shown in FIG. 1, the solenoid valve includes a housing 1 affixed to the vehicle, a core assembly 2 mounted in the housing, and a coil assembly 3 mounted externally around the core assembly 2.

The core assembly 2 is affixed and sealed to the housing 1 by two caulking joints comprised of a primary caulking joint A and a secondary caulking joint B formed between that side of the core assembly 2 exposed to the atmosphere and the opposite side subject to the fluid pressure of the pressure fluid discharge line 105 to be described later.

Housing cavities 101 are bored in the housing 1 in an amount equal to the number of core assemblies 2 to be mounted. Each housing cavity 101 is of variable diameter over its length, formed with a large-diameter segment 102 at the mouth, a medium-diameter segment 103 is the center, and a small-diameter segment 104 at the bottom. The housing 1 can be constructed from aluminum, an aluminum alloy, or other lightweight metal to make the device lighter.

The pressure fluid discharge line 105 connects to the medium-diameter segment 103, and the inlet line 106 connects to the small-diameter segment 104.

The core assembly 2 comprises a sleeve 201, an armature 202 housed with the sleeve, a plunger 203 affixed to the armature, a magnet core 204 through which the plunger 203 is inserted, a spring 205 compressed inside the magnet core, and a body 4 forming the bottom of the magnet core. The body 4 is hollow and is shaped to have a large-diameter segment 401, a medium-diameter segment 402, and a small-diameter segment 403 with diameters equivalent to the large-diameter segment 102, the medium-diameter segment 103, and the small-diameter segment 104 respectively of the housing 1. Pressure chamber 404 with a passage to the discharge line 105 in the housing 1 is formed in the center of the body 4, and a passage cavity 405 is formed integrally from the bottom of the pressure chamber 404 along its axial center line to provide a fluid connection to the inlet line 106. A valve seat 406 is set on the upper edge of the passage cavity 405.

A seal 5 is mounted externally around the circumference of the small diameter segment 403 of the body 4 to seal that segment of the body between the discharge line 105 and inlet line 106 with the small-diameter segment 104 of the housing.

A valve head 206 is formed at the tip of the plunger 203. The valve head 206 and the valve seat 406 on the body 4 comprises a valve arrangement.

The armature assembly in this embodiment made up of the armature 202 and the plunger 203 is constantly urged by the force of the spring 205 in the direction to open the valve.

The core assembly 2 housing the valve arrangement is configured as an integral unit in the manner as described above prior to the caulking procedures.

As shown in FIG. 1, the coil assembly 3 includes a coil 301 positioned around the external circumference of the core assembly 2, a yoke ring 302 which envelopes the coil, and a yoke 303 which covers the upper surface of the ring.

As shown in FIG. 1, the body 4 which forms the bottom portion of the core assembly 2 is affixed to the housing 1 by two caulking joints, the primary caulking joint A inside the housing 1 and the secondary caulking joint B at the mouth of the housing.

The advantage of this device is that both caulking joint A and caulking joint B are formed between that side of the core assembly 2 exposed to the atmosphere and the opposite side of the core assembly 2 facing the discharge line 105 which receives the force of the fluid pressure.

Figure 2:
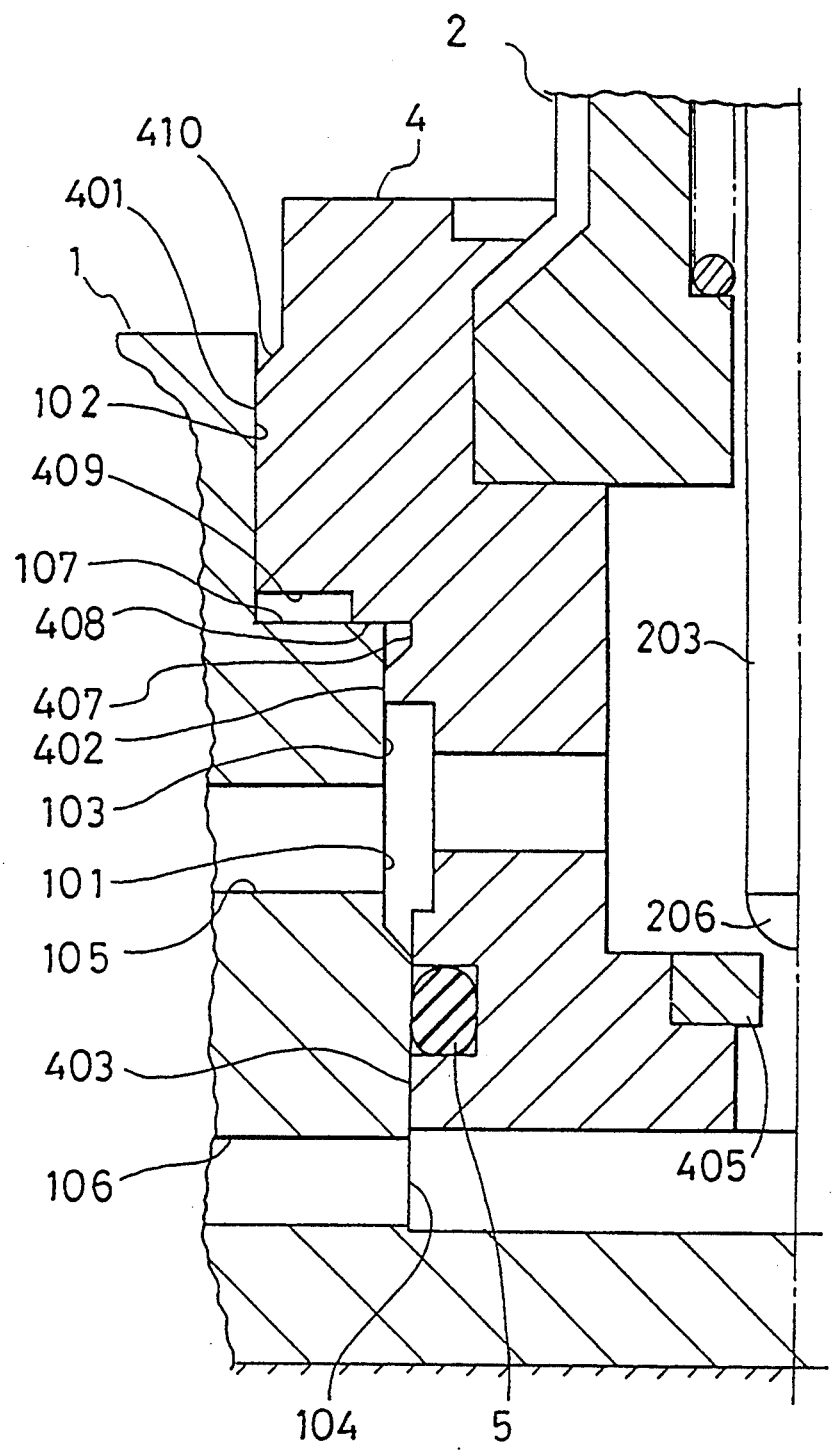
FIG. 2 is an enlarged cross section diagram of the pre-installation structure for the caulking joints of the device according to the invention.
Figure 3:
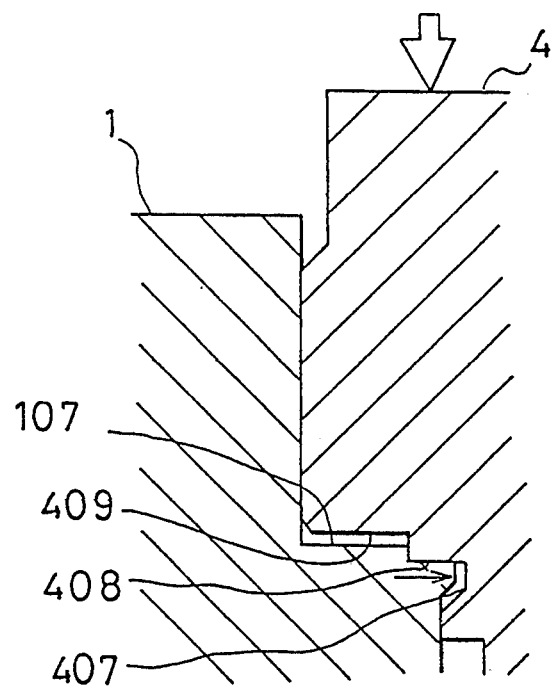
FIG. 3 is an explanatory diagram of a first step of the caulking process.

As shown in FIG. 2, prior to installation, the structure for forming the primary caulking joint A includes a primary sealing groove 407 formed around the circumference of the medium-diameter segment 402 of the body 4, a pressure-acting surface 408 formed above the groove 407, a body abutting surface 409 forming the boundary between the large-diameter segment 401 of the body 4 and the external diameter of the pressure-acting surface 408, and a housing abutting surface 107 forming the boundary between the large-diameter segment 102 and the medium-diameter segment 103 of the housing 1.

Prior to installation, the structure for forming the secondary caulking joint B includes a ridge 410 formed around the circumference of the large-diameter segment 401 of the body 4, and the rim of the mouth of the housing cavity 101 of housing 1.

Procedures to assemble the solenoid valve device are explained below.

Figure 4:
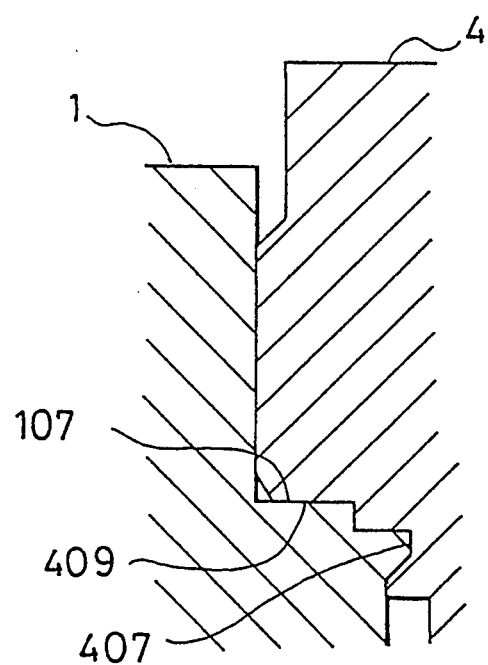
FIG. 4 is an explanatory diagram of a second step of the caulking process.

The body 4 of an inspected core assembly 2 is inserted into the housing cavity 101, and the body 4 is pushed downwards until the pressure-acting surface 408 of the body presses against the edge of the abutting surface 107 of the housing. This causes the edge of the abutting face 107 to undergo plastic deformation and flow into the primary sealing groove 407 of the body 4. Primary caulking is completed when the plastically deformed material completely fills and is crimped inside the primary sealing groove 407 as shown in FIG. 4.

The abutting face 409 of the body can be set to abut against the abutting face 107 of the housing to create a stopper effect which will keep the pressure on the body 4 within a prescribed limit, thus inhibiting an excessive force on the body 4.

Figure 5:
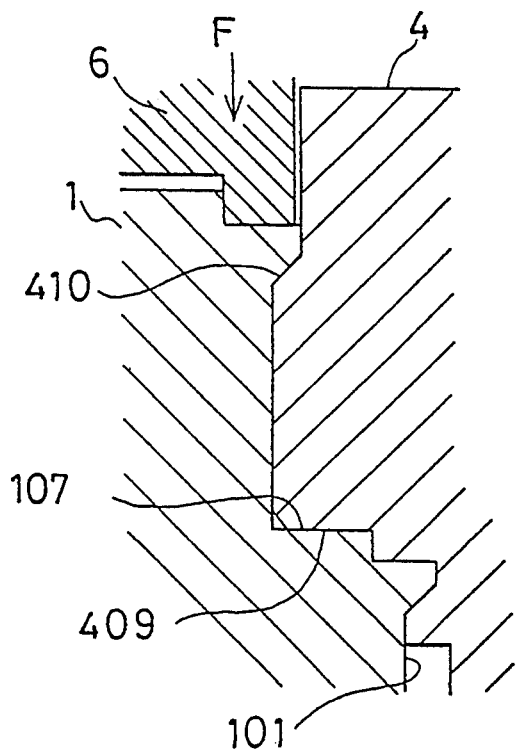
FIG. 5 is an explanatory diagram of the final step of the caulking process.

After primary caulking is completed, as shown in FIG. 5, the rim of the mouth of the housing cavity 101 of the housing 1 is pressed downwards with a punch 6, causing the rim to undergo plastic deformation into the stepped ridge 410. Secondary caulking is completed when the rim completely fills and is crimped inside the ridge 410. In this secondary caulking, the force on the body 4 is borne by the abutting surface 107 of the housing, thereby assuring reliable and secure caulking.

Moreover, since the body 4 is supported in the required position by the abutting face 107 of the housing, the positions of the ridge 410 and the rim of the housing cavity 101 mouth can be maintained accurately with respect to each other, thereby increasing the precision of the secondary caulking.

This double caulking, as described, of the area between the side exposed to the atmosphere and the opposite side which receives the force of the fluid pressure ensures that the core assembly 2 is simultaneously affixed and sealed securely in two places to the housing cavity 101 of the housing 1.

The coil assembly 3 is then fitted around the sleeve 201 and mounted into the housing 1 by a washer 30 sitting on top of the housing. A retaining ring 305 is fitted on top of that portion of sleeve 201 protruding above the coil assembly to hold the unit in place.

These procedures are reversed to dismantle the solenoid valve device.

Example 2

Figure 6:
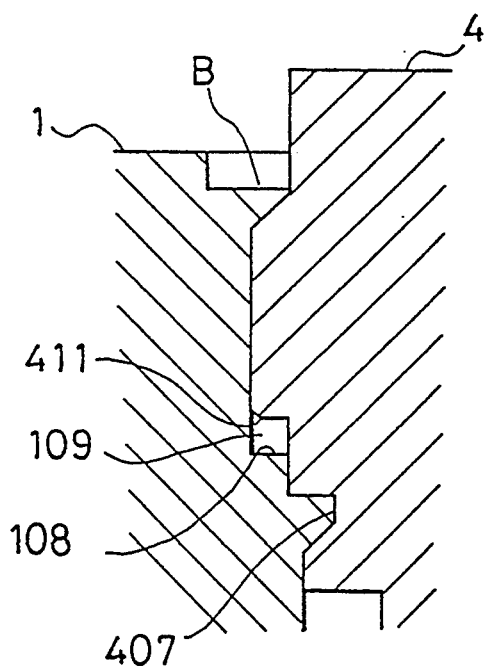
FIG. 6 is an explanatory diagram of a second embodiment of the solenoid valve device as embodied in Example 2.

In Example 1, the abutment of the body abutting face 409 and the housing abutting face 107 acts as a stopper, but this invention can be configured without this particular stopper function. That is, as shown in FIG. 6, once the plastic deforming material completely fills the primary sealing groove 407, a gap 109 can be formed between the housing abutting surface 108 and body abutting face 411, as opposed to having the two surfaces abut each other.

Example 3

Figure 7:
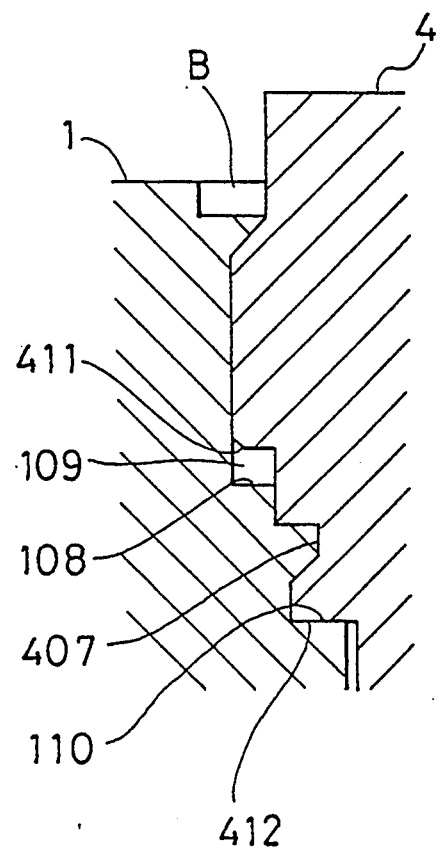
FIG. 7 is an explanatory diagram of a third embodiment of the solenoid valve device as embodied in Example 3.
Figure 8:
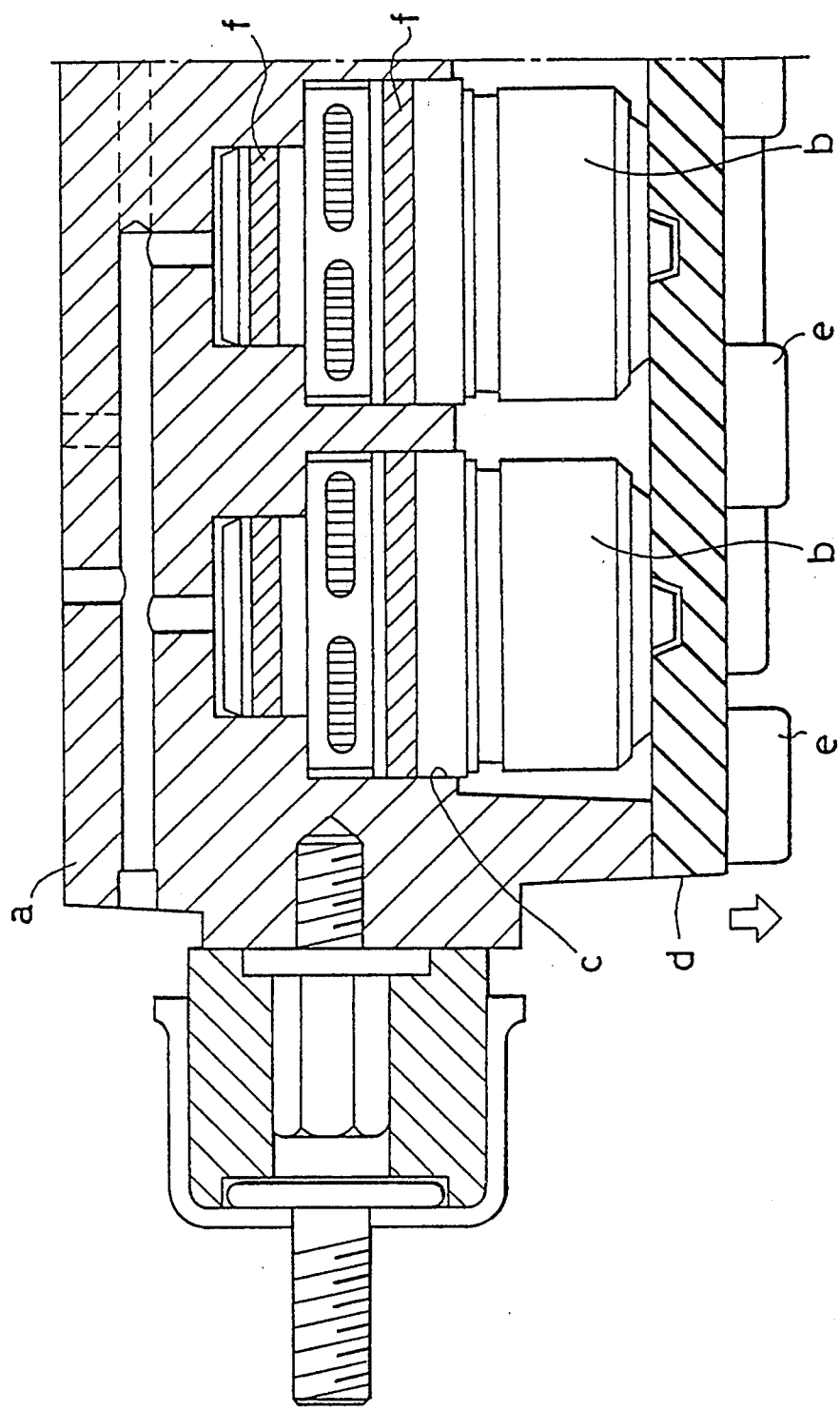
FIG. 8 is an explanatory diagram of a conventional solenoid valve device.

In Example 1, the stopper configuration formed by the body abutting surface 409 and the housing abutting face 107 is established on that side of the primary sealing groove 407 in the direction of the mouth of the housing. However as shown in FIG. 7, a stopper configuration formed by the housing abutting face 110 and body abutting face 412 can be established on the other side of the primary sealing groove 407 towards the interior of the housing.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A solenoid valve comprising:
   a housing having at least one cavity,
   a core assembly including a body, a sleeve attached to said body, and an armature assembly sliding in said sleeve, said core assembly being mounted in said at least one cavity of said housing having a lower portion of said body between a segment of said body exposed to atmosphere and a segment exposed to fluid pressure in use being affixed to said housing by a primary caulked joint inside said at least one cavity and a secondary caulked joint at a mouth of said housing cavity, and
   a coil assembly mounted on an exterior of the core assembly magnetically influencing said armature assembly.

2. The solenoid valve as claimed in claim 1, wherein said primary caulked joint is formed by a pressure acting surface of said at least one cavity of said housing and a primary sealing groove on said body.

3. The solenoid valve as claimed in claim 2, wherein the primary caulked joint is a plastically deformed portion of the material of the housing flow-molded into said primary sealing groove.

4. The solenoid valve as claimed in claim 3, wherein said secondary caulked joint is formed by a lip of said at least one cavity at said mouth and a ridge on said body.

5. The solenoid valve as claimed in claim 4, wherein said secondary caulked joint is a plastically deformed portion of the material of the housing from adjacent the mouth flow-molded into the ridge.

6. A method of mounting a solenoid valve in a housing having at least one cavity, wherein said solenoid valve includes
   a core assembly including a body having a primary sealing groove, a sleeve attached to said body, and an armature assembly sliding in said sleeve, said core assembly being mounted in said at least one cavity of said housing having a lower portion of said body between a segment of said body exposed to atmosphere and a segment exposed to fluid pressure in use being affixed to said housing by a primary caulked joint inside said at least one cavity and a secondary caulked joint at a mouth of said housing cavity, and a coil assembly mounted on an exterior of the core assembly magnetically influencing said armature assembly, said primary caulked joint being formed by the steps of inserting said body into said at least one cavity; pressing said body further into said at least one cavity, said body pressing on a portion of the material of the housing causing the pressed-material to undergo plastic deformation and flow and mold into said primary sealing groove.

7. The method of mounting a solenoid valve as claimed in claim 6, wherein said secondary caulked joint is formed by a lip of said at least one cavity at said mouth and a ridge on said body.

8. The method of mounting a solenoid valve as claimed in claim 7, wherein said secondary caulked joint is formed by the steps of applying pressure on a portion of the material of the housing adjacent the mouth causing the pressed-material to undergo plastic deformation and flow and mold into the ridge.

* * * * *